United States Patent [19]

Aravindakshan et al.

[11] Patent Number: 5,583,193

[45] Date of Patent: Dec. 10, 1996

[54] POLYSACCHARIDE GRAFT-POLYMERS AND THE USE IN PAPERMAKING THEREOF

[75] Inventors: Perincheery Aravindakshan; Velayudhan N. G. Kumar, both of Maharashtra, India.

[73] Assignee: National Starch and Chemical Investment Holding Corporation, Wilmington, Del.

[21] Appl. No.: 452,112

[22] Filed: May 26, 1995

[30] Foreign Application Priority Data

Jun. 2, 1994 [GB] United Kingdom .................. 9411080

[51] Int. Cl.$^6$ .............................. A61K 35/16; B01J 20/00
[52] U.S. Cl. ........................ 527/300; 527/301; 527/302; 527/303; 527/304; 527/305; 527/306; 527/309; 527/310; 527/311; 527/312; 527/313; 527/314; 527/315; 525/54.2; 525/54.21; 525/54.22; 525/54.23; 525/54.24; 525/54.26
[58] Field of Search ................................ 527/300, 301, 527/302, 303, 304, 305, 306, 309, 310, 311, 312, 313, 314, 315; 525/54.2, 54.21, 54.22, 54.23, 54.24, 54.26

[56] References Cited

U.S. PATENT DOCUMENTS 4,507,438  3/1985  Obayashi et al. ...................... 525/119
4,663,163  5/1987  Hou et al. .............................. 424/101

FOREIGN PATENT DOCUMENTS 545228    6/1993   European Pat. Off. .
135162    8/1982   Japan .
5286265  11/1993   Japan .
6048017   2/1994   Japan .
WO9311300 6/1993   WIPO .

Primary Examiner—Nathan M. Nutter
Attorney, Agent, or Firm—Eugene Zagarella, Jr.

[57] ABSTRACT

A process for preparing a modified polysaccharide graft copolymer complex which comprises the steps of:
  i. subjecting polysaccharide to graft copolymerization with a vinyl monomer;
  ii. treating the polysaccharide graft copolymer with:
      a. polyethylene glycol to provide a polymer-PEG complex; or
      b. a silicate compound to provide a silica precipitated polymer; and
  iii. recovering the polymer-PEG complex or silica precipitated polymer.

This modified polysaccharide graft copolymer may be used as a surface sizing agent in the preparation of paper.

14 Claims, No Drawings

POLYSACCHARIDE GRAFT-POLYMERS AND THE USE IN PAPERMAKING THEREOF

The present invention relates to a process for the preparation of modified polysaccharides, in particular, modified polysaccharide-graft-copolymers which amongst other uses are most suitable as paper surface sizing/coating agents in the paper industry. The invention also relates to a process for paper manufacture comprising paper surface sizing/coating using the aforesaid modified polysaccharides and also to paper thereby produced.

BACKGROUND

Surface sizing of paper is an operation often followed by paper manufacturers in the case of writing and printing grades of paper. In surface sizing a thin film of a polymer (often a starch derivative) is coated onto the surface of the paper. The film produced on the surface of the paper improves the surface properties of paper, and thereby reduces the catch on the pen when the paper is written on and prevents pick if the paper is printed with tacky inks. Surface sizing also leads to improvement in oil resistance, porosity and smoothness.

The principal sizing agents commonly used in the paper industry are starch, animal glue, carboxymethyl cellulose, methyl cellulose, polyvinyl alcohol, and wax emulsions. Certain synthetic resins are also used for surface sizing of paper. It is felt that the surface properties need to be improved further to provide paper having better printability, smoothness, varnishability, gloss, etc.

OBJECTS

It is an object of the present invention to provide modified polysaccharides which may be used as surface sizing agents which will significantly improve the surface properties of paper, such as gloss, oil absorbency, smoothness, porosity and printability of the paper.

It is a further object of the invention to provide a method for the production of paper having improved varnishability and other improved surface characteristics.

It is yet another object of the present invention to provide paper having improved varnishability together with improvements like enhanced gloss, oil absorbency, smoothness, reduced porosity and printability.

INVENTION

The present invention relates to a process for the preparation of modified polysaccharide-graft-copolymer (herein after referred to as "modified polymers") comprising the steps of:

i) subjecting polysaccharide to graft copolymerization with one or more vinyl monomers;

ii) (a) treating polysaccharide graft copolymer (herein after referred to as "the polymer") with polyethylene glycol (PEG) to provide polysaccharide graft copolymer-PEG complex; or (b) treating the polysaccharide graft copolymer with a silicate compound to provide a silica precipitated polysaccharide graft copolymer;

iii) recovering the polymer-PEG complex or the silica precipitated polymer.

The polysaccharides used in the present invention are preferably chosen from starch, guar gum, tamarind gum, locust bean gum, xanthan gum and the like. These materials may be of any origin and either used as such or in a physically or chemically modified form. More preferably starch is used in the process of the invention and it may be a native starch, degraded starch or any other chemically or physically modified starch.

Graft Copolymerization

The graft copolymerization of polysaccharide in accordance with this invention is carried out with a vinyl monomer or unsaturated synthetic monomer. More particularly, the step of graft copolymerization of the polysaccharide is preferably carried out with a monomer selected from methacrylic acid, vinyl acetate or combinations of such monomers. Graft copolymerization is a well known procedure and is generally described in "Encyclopedia of Polymer Science and Engineering", Vol. 7, 1987, pp. 551 to 479. Further details of the graft copolymerization process is described in our accepted Indian Patent No. 172039. The copolymerization of polysaccharide with vinyl monomer is carried out using from 0.1 to 200% of monomer, or combination thereof, based on the weight of grafted starch and preferably from 1 to 50%. The polymer thus obtained is thereafter subjected to PEG complexation or silica precipitation as hereinafter described.

PEG Complexation Of The Polymer

The polymer is contacted with an aqueous solution of polyethylene glycol (PEG) by (i) spraying PEG solution onto it; or (ii) slurrying the graft polymer in water and filtering it to form a filter cake to which is added PEG solution in water, the mixture being recovered by drying or (iii) mixing PEG and the graft copolymer.

The PEG is added to the graft copolymer in an amount of from 0.1 to 100% by weight, based on the weight of grafted copolymer and preferably from 1 to 10%.

Silica Precipitation On Polymer

The starch-graft polymer is made into a slurry with water. The solution of a silicate compound is added to the polymer and the pH is adjusted to a pH range 3 to 6.8 by adding an acid, e.g., hydrochloric acid, sulphuric acid, etc. The silicate compound is typically an alkaline silicate compound and more particularly an alkaline metal or alkaline earth metal silicate. The reaction mixture is thereafter stirred, filtered, washed and dried. The silicate is added to the graft copolymer in an amount of from 0.5 to 100% by weight, based on the weight of grafted copolymer and preferably from 1 to 50%.

Surface Sizing Of Paper

A further aspect of the invention is a process for surface sizing of paper using the polymer-PEG complex or the silica precipitated polymer according to the invention. For this purpose any conventional surface sizing process and any conventional equipment for surface sizing can be used. Simply the conventional surface sizing agent used in such process is substituted by the polymer PEG complex or the silica precipitated polymer according to the invention. The modified polysaccharide graft copolymer complexes of this invention will be used in paper surface sizing in an amount of from 0.1 to 20% and preferably from 0.5 to 5% by weight, based on the weight of paper on a dry basis.

Apart from the improved surface properties as herein before described the paper thus obtained also has increased strength.

The present invention also relates to paper prepared by the process aforesaid.

EXAMPLES

The invention will now be illustrated with a few typical non-limiting working examples. In the experiments, the following materials have been used.

| Materials | Grade |
| --- | --- |
| Water | 5° FH. |
| Tapioca starch | commercial grade |
| Ascorbic Acid | Technical grade |
| Ferous amm. sulphate | LR grade (LR: Laboratory Reagent) |
| Hydrogen peroxide | 30% (w/v), LR grade |
| Methacrylic acid | Commercial grade |
| Vinyl acetate | LR grade |
| Hydrochloric acid | LR grade |
| Sodium hydroxide | Pellets-LR grade |
| PEG-4000 | LR grade |
| Sodium silicate | 42% aqueous solution |

EXAMPLE I

Degradation Of Starch

Tapioca starch (1 kg, 13% moisture) was slurried in water (1.3 kg) and added into a 5L three-necked round bottomed flask fitted with a mechanical stirrer. Hydrochloric acid solution (20 g concentrated hydrochloric acid in 200 ml water) was added, the temperature was maintained at 52° C. for 16 hours. The pH was adjusted with aqueous sodium hydroxide solution (3% NAOH solution) to 5.5. The degraded starch was recovered by filtration and it was dried first in air at room temperature and finally in an air oven at 50° C. till the moisture content became less than 15%.

EXAMPLE II

Graft Copolymerization Of Degraded Starch With Methacrylic Acid (Deg. SPMAA)

The degraded tapioca starch obtained according to Example I (1 kg, 13% moisture) was slurried in 1 kg water containing 30 g of urea and added in a 5L three-necked round bottomed flask fitted with a mechanical stirrer. The slurry was stirred for 1 hr. Ferrous ammonium sulphate solution (0.5 g in 10 ml water) was added, followed by methacrylic acid (50 g) and $H_2O_2$ (30% w/v, 5 ml). The reaction mixture was stirred for 2 hours. The polymer was filtered, washed three times with equal volume of water (1 kg water) and dried.

EXAMPLE III

Graft Copolymerization Of Degraded Starch With Vinyl Acetate (Deg. SPVAc)

Degraded starch (1 kg, 13% moisture) of Example I was slurried in water (1.5L) containing 30 g of urea in a 5L three-necked round bottomed flask fitted with a mechanical stirrer and stirred for 1 hr. Ferrous ammonium sulphate (0.5 g), followed by vinyl acetate (50 g) and $H_2O_2$ (5 ml of 30% w/v solution) were added to it. The stirring was continued for 2 hours. The reaction mixture was filtered, washed three times with water (1 kg water each time) and dried.

EXAMPLE IV

Synthesis Of Degraded Starch Graft Poly(methacrylic acid-co-vinyl acetate) (Deg. SP(MAA-co-VAc)

Degraded starch graft poly(methacrylic acid-co-vinyl acetate) was synthesized by first grafting degraded starch with methacrylic acid as shown in Example II and then grafting vinyl acetate onto the degraded starch-graft-polymethacrylic acid in the second step according to Example III.

EXAMPLE V

Synthesis Of Degraded Starch Graft Polymethacrylic Acid-polyethyleneglycol Complex (De %. SPMAA With PEG)

Degraded starch-graft polymethacrylic acid obtained according to Example II (1 kg) was slurried in water (1 kg) and filtered through a Buchner funnel. Just before the filter cake cracked, PEG solution (20 gms in 200 ml) was added to the Buchner funnel and the solution was allowed to absorb on the filter cake. Before the filter cake cracked, the cake was removed, it was dried in air for 4 hours and finally in an air oven at 50° C. till the moisture level became less than 15%.

EXAMPLE VI

Synthesis Of Insitu-silica Precipitated Degraded Starch Graft Polymethacrylic Acid Degraded starch graft polymethacrylic acid (100 g) obtained according to Example II was slurried in water (150 g). Alkaline sodium silicate (20 g, 42% solution in water) was added and stirred. The pH was adjusted very slowly to 6.6 with hydrochloric acid (5% solution). The reaction mixture was stirred for 1 hour, filtered, washed three times with water (100 g water for each wash) and dried.

EXAMPLE VII

Synthesis Of Insitu-silica Precipitated Degraded Starch Graft Poly(methacrylic-co-vinyl-acetate)-SP(MAA-co-VAc)

Degraded starch graft P(MAA-co-VAc) (100 g) was slurried in water (150 g). Alkaline sodium silicate (20 g, 42% solution) was added and stirred. The pH was adjusted very slowly to 6.6 with hydrochloric acid (5% solution). The reaction mixture was stirred for 1 hour, filtered, washed and dried.

The modified polymers according to the invention were evaluated and the results of such study are set out hereinbelow.

Evaluation Of The Modified Polymers For Surface Sizing Of Paper

Preparation Of Films By Solvent Casting

The starch derivative (10 g) was taken in a 150 ml beaker, water was added (90 g) and kept in a boiling water bath. A dispersion was obtained which was stirred continuously for 2 minutes with a glass rod till it thickened.

Then it was kept for 20 minutes at 90°–95° C. The hot dispersion was allowed to cool to 50° C. and sieved through a 500 micron sieve to remove any lumps, films formed on the surface, etc. The sieved dispersion was spread over a teflon coated metal plate and it was dried in a humidity chamber at 91 RH and 40° C.

Properties Of Casted Films

The films prepared by solvent casting were evaluated qualitatively for brittleness, smoothness, and uniformity.

Coating Of Paper

Non-surface sized creamwove paper of 62 g/m2 with 80% bamboo and 20% hardwood furnish was used as the base paper. Two percent (2%) levels of coatings were applied using coating rods.

Varnishing

Commercial grade varnish sample was used for varnishing of base and coated papers.

Determination Of % PMAA In Degraded SPMAA

A 1 g sample was dispersed in 100 ml of distilled water in a conical flask and kept in a boiling water bath for 20 minutes with intermittent stirring. The dispersion was cooled to room temperature. Twenty (20) ml of 0.1N sodium hydroxide solution was added to it and the stirring was continued for 30 minutes. The contents were back titrated with 0.1N. HCl using phenolphthalein as indicator. The % PMAA is calculated as follows:

$$\% \text{ PMAA add-on} = \frac{(TV_1 \times N_1 - TV_2 \times N_2) 86 \times 100}{1000 \times \text{wt of dry sample}}$$

$TV_1$=ml of NAOH used
$TV_2$=ml of HCl titre value
$N_2$=normality of NAOH
$N_2$=normality of HCl Determination Of % PVAC In Deqraded SPVAC and SP(MAA-co-VAc)

A 1 g sample and 20 ml of methanol was taken in an iodine flask and stirred for 5 minutes. Twenty (20) ml of 0.2N methanolic sodium hydroxide solution (8 g sodium hydroxide, 125 ml distilled water and remainder methanol to 1 liter) was added and refluxed for 4 hours in a water bath maintained at 90° C. The dispersion was cooled to room temperature and back titrated against 0.2N hydrochloric acid solution using phenolphthalein as indicator. Blank titrations with degraded tapioca starch for degraded SPVAC and with degraded SPMAA for degraded SP(MAA-co-VAc) were carried out. The % PVAC is calculated as follows:

% PVAc add-on =

$$\frac{[(TV_3 \times N_1 - TV_4 \times N_2) - (TV_1 \times N_1 - TV_2 \times N_2)] \times 86 \times 100}{1000 \times \text{wt of dry sample}}$$

Where,
$TV_1$=$TV_3$=ml of methanolic NAOH used
$TV_2$=ml of HCl titre value for blank
$TV_4$=ml of HCl titre value for sample
$N_1$=normality of NAOH
$N_2$=normality of HCl Brookfield Viscosity Of Starches The moisture content of starches were determined by heating the samples in an air oven at 130° C. for 3 hours. Ten (10) g of dry sample was dispersed in 90 g water in a 150 ml beaker and cooked in a boiling water bath for 20 minutes. The hot dispersion was screened through a 500 microns sieve and the viscosity was determined at 50° C. using a Brookfield viscometer Model LVT at 60 RPM.

Determination Of Silica In Modified Polymers

The modified polymer (5 g) was taken in a silica crucible and the organic matter was burnt by a Bunsen flame. Then the crucible was heated at 900° C. for 2 hours in a Muffle furnace. The crucible was cooled in a dessicator and the ash was determined. From the ash content, the amount of silica in the sample was calculated as follows:

% Silica=% Ash in Deg. SPMAA with silica–% Ash in Deg. SPMAA.

Sizing Studies

Currently, the surface sizing starches which are known to perform well are FIBER SIZE 272 (oxidized starch) and KOFILM 50 (starch acetate). Both are products from Hindustan Lever Limited. Therefore, the surface sizing and varnishability properties of these starch derivatives were initially evaluated.

Surface sizing was carried out by coating the surface of paper with a film of the starch derivative. The starch derivative was cooked in water and the cooked dispersion was applied on the surface of the paper by using coating rods. The amount of starch derivative film formed on the surface of the paper was 2% on weight of the paper. This surface sized paper was further applied with varnish to get varnished paper.

The results on the evaluation of the sized paper are given in Table I. The results indicated that commercially available surface sizing agents like KOFILM 50 and FIBER SIZE 272 (commercial products from Hindustan Lever Limited, FBP, Pondicherry) improved the properties of paper and also gave rise to considerable improvement in gloss of the varnished paper. KOFILM 50 in fact gave better printability and oil absorbency values. The % gloss of the varnished paper was also marginally better as compared to FIBER SIZE 272.

In Table II, the % add-on of grafted polymer, viscosities of derivatized starches and silica content are brought out. The starch derivatives according to the invention were cooked in water at 10% concentrations and films were cast on spreading on Teflon coated metal plates and water evaporating in constant humidity maintained at 91 RH and 40° C. The properties of the films were qualitatively evaluated and the results are given in Table III. The results indicate that graft copolymerization of degraded starch with methacrylic acid and vinyl acetate improved the film properties and the grafted starch obtained by the combination of methacrylic acid and vinyl acetate gave the best film in terms of gloss, smoothness and flexibility.

The surface sizing properties of these modified polymers were then evaluated and the results are given in Table IV. The results indicated that degraded starch graft polyvinyl acetate, degraded starch graft polymethacrylic acid and degraded starch graft poly(methacrylic acid-co-vinyl acetate gave improvement in % gloss of the varnished paper as compared to the base paper. The new set of starch derivatives were then evaluated for their surface sizing properties. The results are given in Table V.

The significant result in this case as evident from the table is that all the three samples evaluated gave significant improvement in porosity. This indicated the formation of a continuous uniform film formation on the surface. There were significant improvement in smoothness and oil absorbency values. The actual varnishability tests have shown (as seen from the table) that % gloss of the varnished paper improved from 30% for the control to 60 to 64% for the three test samples. These values are improvements over the previous samples tested which included KOFILM 50 and FIBER SIZE where the varnished paper gave a % gloss varying between 49 and 54%. The printability of the surface sized paper was also evaluated and the results indicated in the table suggest that there is overall improvement in printability. The marked improvement in oil absorbency of degraded starch graft polymethacrylic acid-PEG complex is very significant.

The level of surface coating was 2% on the weight of paper.

The varnishability of paper improved significantly by using degraded starch graft polymethacrylic acid-PEG complex or degraded starch graft polymethacrylic acid coprecipitated with silica or degraded starch graft poly (vinylacetate-co-methacrylic acid) precipitated with silica. There was overall improvement in properties like % gloss (improved from 6 to 30), % gloss after varnishing (22 to 60), oil absorbency (improved from 0.25 to 150), smoothness (improved from 620 to 77), porosity (improved from 450 to nil) and printability (improved from 5 to 10).

Table VI gives the surface properties of paper sized with degraded SPMAA-PEG Complex and its blends with oxidized starch. The results indicate that the blends are also useful in improving the surface properties of paper.

TABLE I

Properties of surface sized paper

| Sample | % Gloss of Varnished Paper* | Smoothness Bendtsen ml/min** | Oil Absorbency min* | Brightness % El* |
|---|---|---|---|---|
| Base Paper | 30 | 600 | 0.25 | 70.0 |
| Fibre size 272 | 49 | 560 | 6.6 | 69.6 |
| Kofilm 50 | 52 | 540 | 27.0 | 69.6 |

*Higher the value, better is the quality of paper.
**Lower the value, better is the quality of paper.

TABLE II

The % add-ons of synthetic polymer, % silica and Brookfield viscosities of derivatized starches

| Sr. | Sample | % Add-on Polymer I | % Add-on Polymer II | % Silica | Brookfield viscosity 50° C., 60 RPM (10% Soln) Spindle No. | Viscosity CPS |
|---|---|---|---|---|---|---|
| 1. | Deg. Starch | — | — | — | 3 | 680 |
| 2. | Deg. SPVAc | 6.94 | — | — | 4 | 2000 |
| 3. | Deg. SPMAA | 3.96 | — | — | 1 | 50 |
| 4. | Deg. SP(MAA-Co-VAc) | 3.96 | 3.65 | — | 3 | 390 |
| 5. | Deg. SPMAA with PEG | 3.96 | — | — | 3 | 850 |
| 6. | Deg. SPMAA with silica | 3.96 | — | 6.5 | 2 | 118 |
| 7. | Deg. SP(MAA-Co-VAc) with PEG | 3.96 | 3.65 | — | 2 | 88 |
| 8. | Deg. SP(MAA-Co-VAc) with silica | 3.96 | 3.65 | 6.9 | 1 | 18 |
| 9. | KOFILM-50 | — | — | — | 2 | 208 |

TABLE III

The properties of cast films evaluated qualitatively

| Sample | Smoothness | Flexibility | Uniformity | Gloss |
|---|---|---|---|---|
| Degraded starch | X | X | X | X |
| KOFILM 50 | G | G | G | X |
| Degraded SPVAc | X | G | X | X |
| Degraded SPMAA | G | X | G | G |
| Degraded S(PMAA-Co-PVAc) | G | G | G | G |

X = not good
G = good

TABLE IV

Surface sizing properties of grafted starches

| Sample | % gloss of varnished paper* | Smoothness Bendtsen ml/min** | Oil Absorbency* | Brightness % El* |
|---|---|---|---|---|
| Base paper | 30 | 600 | 0.25 | 70.0 |
| KOFILM 50 | 52 | 540 | 27.0 | 69.6 |
| Deg. SPVAc | 51 | 500 | 25.0 | 68.5 |
| Deg. SPMAA | 50 | — | — | — |
| Deg. SP(MAA-VAc) | 54 | — | — | — |

*Higher the value, better is the quality of paper.
**Lower the value, better is the quality of paper.

TABLE V

| | Properties of surface sized paper | | | | | | |
|---|---|---|---|---|---|---|---|
| | % Gloss* | | Oil | Smoothness | | | |
| Sample | Before Varnishing | After Varnishing | Absorbency (min)* | Bendsten ml/min** | Porosity ml/min** | Printability (ink density)* | Brightness % E1* |
| Base Paper | 6 | 30 | 0.25 | 620 | 450 | 5 | 70 |
| Degraded starch graft PMAA with PEG | 22 | 60 | 150 | 71 | Nil | 10 | 66 |
| Degraded starch graft PMAA with silica | 19 | 60 | 60 | 77 | Nil | 8 | 67 |
| Degraded starch graft P(MAA-M-80-VAC) with silica | 19 | 64 | 33 | 75 | Nil | 6 | 67 |
| KOFILM 50 | — | 52 | 27 | 540 | — | 10 | 69.6 |

*Higher the value, better is the quality of paper.
**Lower the value, better is the quality of paper.

TABLE VI

Properties of surface sized paper using Degraded SPMAA-PEG Complex blend with oxidized starches as sizing agent

| Sample | % Gloss* IGT stain length mm | Surface Oil Absorbency* ml/sec |
|---|---|---|
| Oxidized starch | 44 | 17 |
| Degraded starch-graft PMAA-PEG Complex | 61 | 85 |
| Blend of Degraded SPMAA-PEG Complex and oxidized starch 25/75 | 54 | 84 |
| Blend of Degraded starch PMA with PEG and oxidized starch 50/50 | 54 | 64 |

*Higher the value, better is the quality of paper.

We claim:

1. A process for preparing a modified polysaccharide graft copolymer complex which comprises the steps of:
   i. subjecting polysaccharide to graft copolymerization with a vinyl monomer;
   treating the polysaccharide graft copolymer with
      a. polyethylene glycol (PEG) to provide a polymer PEG complex; or
      b. treating the polysaccharide graft copolymer with a silicate compound to provide a silica precipitated polymer; and
   recovering the polymer-PEG complex or silica precipitated polymer.

2. The process of claim 1 in which the polysaccharide is chosen from native or physically or chemically modified starch, guar gum, tamarind gum, cellulose, locust bean gum or xanthan gum.

3. The process of claim 2 in which the polysaccharide is native starch or chemically or physically modified starch.

4. The process of claim 2 in which graft copolymerization of the polysaccharide is carried out with methacrylic acid, vinyl acetate or combinations of these monomers in a weight ratio of 1:001 to 2, polysaccharide to monomer.

5. The process of claim 2 in which the polysaccharide graft copolymer is contacted with polyethylene glycol (PEG) or an alkaline silicate compound wherein the weight ratio of the polysaccharide graft copolymer to PEG is 1:0.001 to 1 and the polysaccharide graft copolymer to silicate is 1:0.005 to 1.

6. The process of claim 5 in which the graft copolymerization of the polysaccharide is carried out with methacrylic acid, vinyl acetate or combination of these monomers in a weight ratio of 1:0.001 to 2, polysaccharide to monomer.

7. The process of claim 6 in which the polysaccharide is native starch or chemically or physically modified starch.

8. The process of claim 7 in which the polysaccharide graft copolymer is contacted with polyethylene glycol (PEG) or an alkaline silicate compound wherein the weight ratio of the polysaccharide graft copolymer to PEG is 1:0.01 to 0.1 and the polysaccharide graft copolymer to silicate is 1:0.01 to 0.5.

9. A process for surface sizing of paper wherein the paper surface is treated with 0.5 to 20% by weight, based on the weight of dry paper, of the modified polysaccharide graft copolymer prepared according to the process of claim 1.

10. The process for surface sizing of paper wherein the paper surface is treated with 0.5 to 20% by weight, based on the weight of dry paper, of the modified polysaccharide graft copolymer prepared according to the process of claim 6.

11. The process for surface sizing of paper wherein the paper surface is treated with 0.5 to 20% by weight, based on the weight of dry paper, of the modified polysaccharide graft copolymer prepared according to the process of claim 8.

12. Paper which is surface sized by treating the paper surface with 0.5 to 20% by weight, based on the weight of dry paper, of a modified polysaccharide graft copolymer which is prepared by the steps of:
   i. subjecting polysaccharide to graft copolymerization with a vinyl monomer;
   ii. treating the polysaccharide graft copolymer with
      a. polyethylene glycol (PEG) to provide a polymer PEG complex; or
      b. treating the polysaccharide graft copolymer with a silicate compound to provide a silica precipitated polymer; and
   iii. recovering the polymer-PEG complex or silica precipitated polymer.

13. The paper of claim 12 wherein the polysaccharide is chosen form native or physically or chemically modified starch, guar gum, tamarind gum, cellulose, locust bean gum or xanthan gum;

the graft copolymerization is carried out with methacrylic acid, vinyl acetate or combinations of these monomers in a weight ratio of 1:0.001 to 2, polysaccharide to monomer; and the polysaccharide graft copolymer is contacted with polyethylene glycol (PEG) or an alkaline silicate compound wherein the weight ratio of the polysaccharide graft copolymer to PEG is 0.001 to 1 and the polysaccharide graft copolymer to silicate is 1:0.005 to 1.

14. The paper of claim 13 in which the polysaccharide is native starch or chemically or physically modified starch; and the polysaccharide graft copolymer is contacted with polyethylene glycol (PEG) or an alkaline silicate compound wherein the weight ratio of the polysaccharide graft copolymer to PEG is 0.01 to 1 and the polysaccharide graft copolymer to silicate is 1:0.01 to 0.5.

* * * * *